(12) United States Patent
Rochette (10) Patent No.: US 6,886,498 B1
(45) Date of Patent: May 3, 2005

(54) ANIMAL LEASH AND RUNNING DEVICE

(76) Inventor: Francis A. Rochette, 7 N. Brookfield Rd., Spencer, MA (US) 01562

( * ) Notice: Subject to any disclaimer, the term of this patent is extended or adjusted under 35 U.S.C. 154(b) by 0 days.

(21) Appl. No.: 10/694,223

(22) Filed: Oct. 28, 2003

(51) Int. Cl.⁷ .................................................. A01K 1/06
(52) U.S. Cl. ....................................... 119/785; 119/784
(58) Field of Search ................................. 119/785, 784; D30/154; 105/154, 155

(56) References Cited

U.S. PATENT DOCUMENTS

| | | | |
|---|---|---|---|
| 1,563,212 A | 11/1925 | Madiar | |
| 2,953,116 A | 9/1960 | Lund | |
| 3,648,664 A | * 3/1972 | Nunley | 119/785 |
| 3,678,903 A | 7/1972 | Ferraro | |
| 4,161,924 A | * 7/1979 | Welker | 119/482 |
| 4,862,833 A | * 9/1989 | Brotz | 119/785 |
| 5,127,338 A | * 7/1992 | Flux | 105/151 |
| D346,047 S | 4/1994 | Peterson | |
| 5,339,773 A | 8/1994 | Van Druff | |
| 5,437,246 A | * 8/1995 | Noles | 119/785 |
| 5,443,038 A | 8/1995 | Marino | |
| 5,746,157 A | * 5/1998 | Warwaruk | 119/785 |

* cited by examiner

Primary Examiner—Teri Pham Luu
Assistant Examiner—Bret Hayes (57) ABSTRACT

An animal leash and running device for allowing movement of leashed animal includes an elongated flexible member. The flexible member extends through a runner such that the runner may be selectively positioned along a length of the flexible member. An elongated tubular member has a bend therein such that the elongated tubular member forms an obtuse angle. The flexible member extends through the elongated tubular member. A coupler is attached to the elongated tubular member for selectively coupling the elongated tubular member to a vertical structure. A leash has a first end and a second end. The first end of the leash is attached to the runner. The second end of the leash may be releasably coupled to an animal.

11 Claims, 6 Drawing Sheets

ANIMAL LEASH AND RUNNING DEVICE

BACKGROUND OF THE INVENTION

1. Field of the Invention

The present invention relates to animal running devices and more particularly pertains to a new animal running device for allowing movement of an animal along the length of a cord.

2. Description of the Prior Art

The use of animal running devices is known in the prior art. U.S. Pat. No. 5,339,773 describes a device including a runner that is mounted on a track so that the runner may move along the track between points of mounts for the track. Another type of animal running device is U.S. Pat. No. 3,678,903 having a runner which mounted on a cable so that the runner may move along the length of the cable. This device has the drawback that the runner may get caught in the guides of the cable or the cable itself may be pulled out of the guides. U.S. Pat. No. 1,563,212 describes a device allowing a leashed animal to run between two points which are positioned in a spaced relationship with a ground surface.

While these devices fulfill their respective, particular objectives and requirements, the need remains for a device that includes a runner having better stability and freedom of motion than those of previous construction which will lead in turn to greater choice in selection of movement of the animal leashed thereto.

SUMMARY OF THE INVENTION

The present invention meets the needs presented above by including a runner mounted on an elongated flexible member. The runner freely moves along the elongated flexible member and over one or more tubular members through which the elongated flexible member runs. The elongated tubular members are attachable to vertical members to position the flexible member above a ground surface.

Another object of the present invention is to provide a new animal running device that includes a spring biased guide wheel for providing movement of the runner within the runner guide to further ensure that the runner does not get caught on a runner guide on which the elongated tubular member is mounted.

Still another object of the present invention is to provide a new animal running device that includes a runner guide having flared openings to facilitate the movement of the runner into the runner guide.

To this end, the present invention generally comprises an elongated flexible member. The flexible member extends through a runner such that the runner may be selectively positioned along a length of the flexible member. An elongated tubular member has a bend therein such that the elongated tubular member forms an obtuse angle. The flexible member extends through the elongated tubular member. A coupler is attached to the elongated tubular member for selectively coupling the elongated tubular member to a vertical structure. A leash has a first end and a second end. The first end of the leash is attached to the runner. The second end of the leash may be releasably coupled to an animal.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 8 thereof, a new animal running device embodying the principles and concepts of the present invention and generally designated by the reference numeral 10 will be described.

As best illustrated in FIGS. 1 through 8, the animal leash and running device 10 generally comprises an elongated flexible member 12. The flexible member 12 preferably includes a cord which may be comprised of metal, plastic, rope or other suitable material typically used for leashing an animal 8, such as a dog.

The flexible member 12 extends through a runner 14 such that the runner 14 may be selectively positioned along a length of the flexible member 12. The runner 14 includes a housing 15 having a upper wall 16, a lower wall 17, an first lateral wall 18 and a second lateral wall 19 such that than an elongated aperture 20 is defined extending through the housing 15 and between the first 16 and second 17 ends. The first lateral wall 18 has a slot 21 extending therethrough and into the aperture 20. The slot 21 is preferably orientated substantially perpendicular to a longitudinal axis of the housing 15 which extends through the upper wall 16 and lower wall 17. The flexible member 12 may be extended through the slot 21 for selective positioning into the runner 14. A loop 22 is attached to the lower wall 17 of the housing 15 for reasons which will become obvious below.

The runner 14 includes a first guide wheel 24 that is rotatably mounted in the aperture 20 and is positioned nearer the upper wall 16 of the housing 15 than the lower wall 17. The first guide wheel 24 has a rotational axis orientated substantially perpendicular to the longitudinal axis of the housing 15 and perpendicular to a plane of the first lateral wall 18. The first guide wheel 24 has a perimeter edge 25 having a peripheral depression 26 extending therein for releasably receiving the flexible member 12. The perimeter edge 25 of the first guide wheel is preferably adjacent to the slot 21 extending through the first lateral wall 18.

Figure 1:
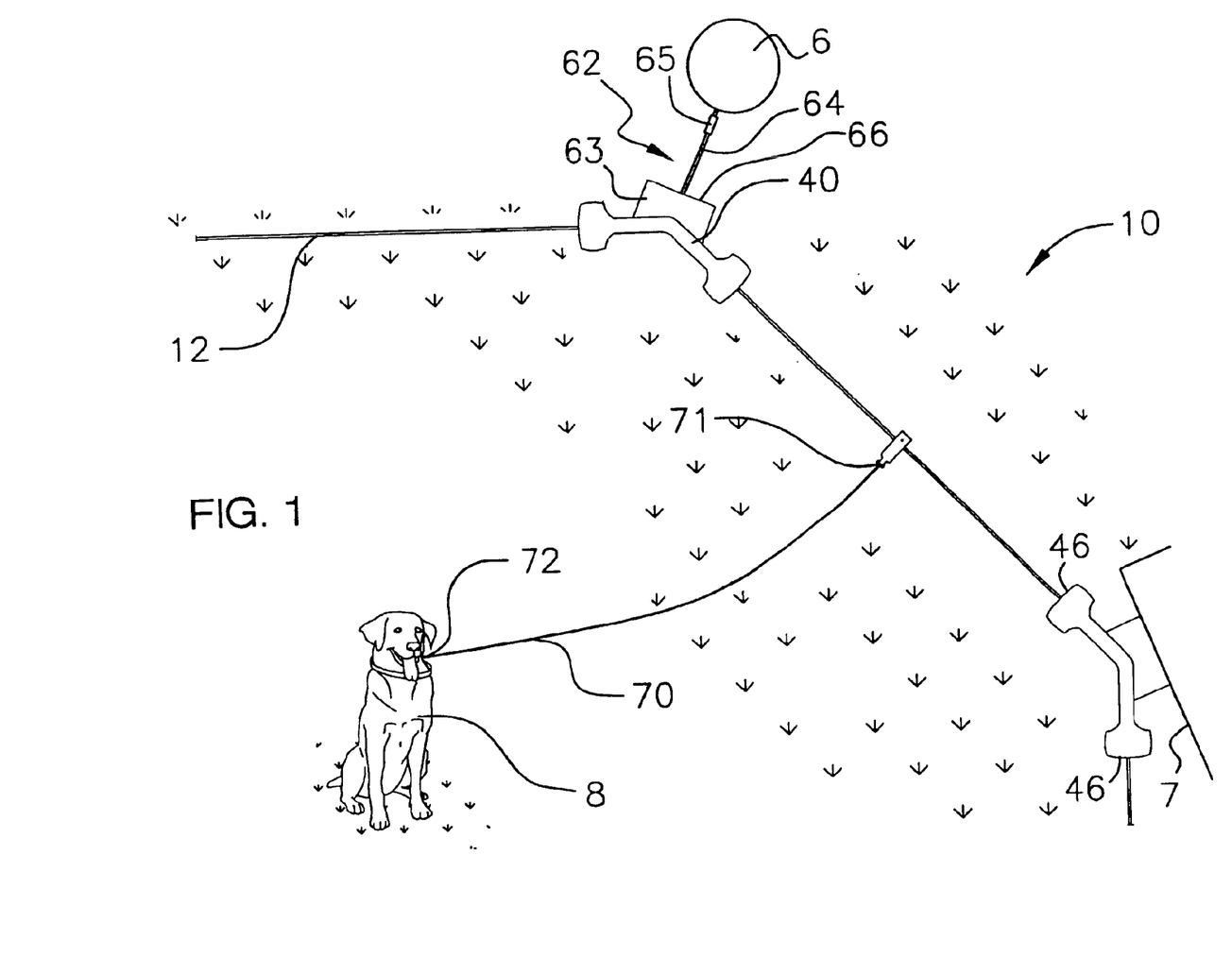
FIG. 1 is a schematic in-use view of an animal leash and running device according to the present invention.
Figure 2:
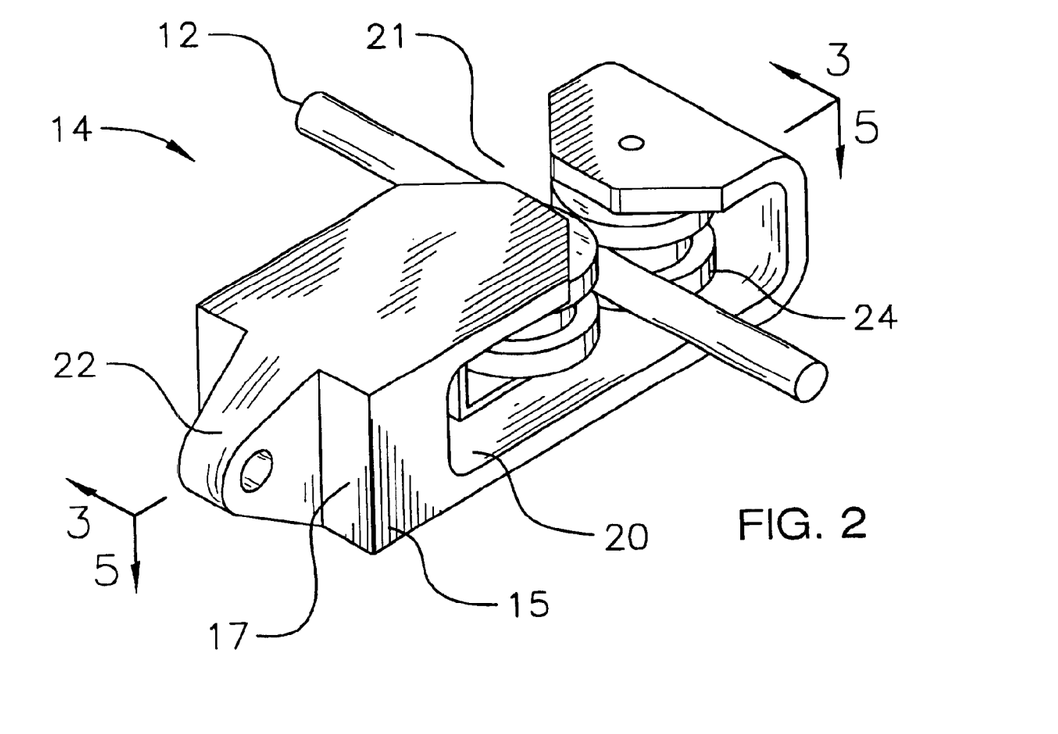
FIG. 2 is a schematic perspective view of the runner of the present invention.
Figure 3:
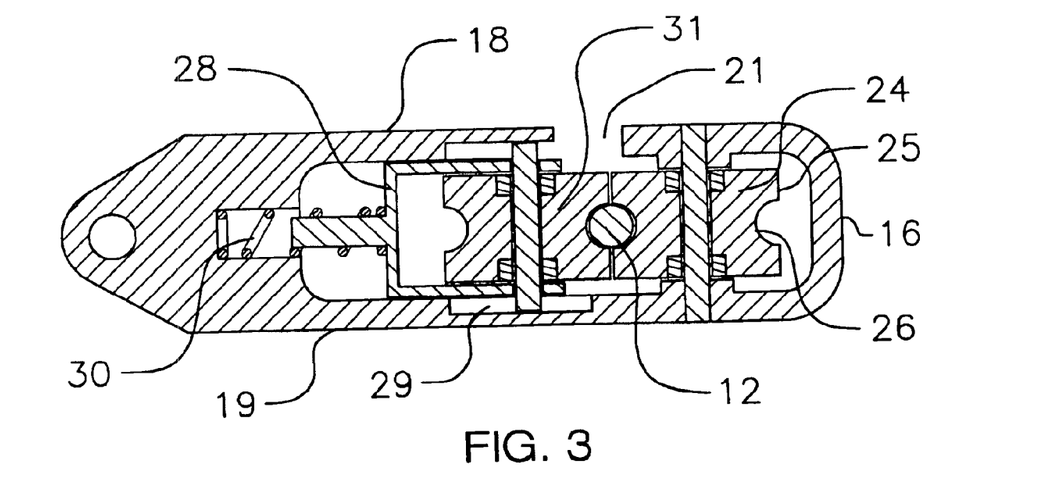
FIG. 3 is a schematic cross-sectional view taken along line 3—3 of FIG. 2 of the present invention.
Figure 4:
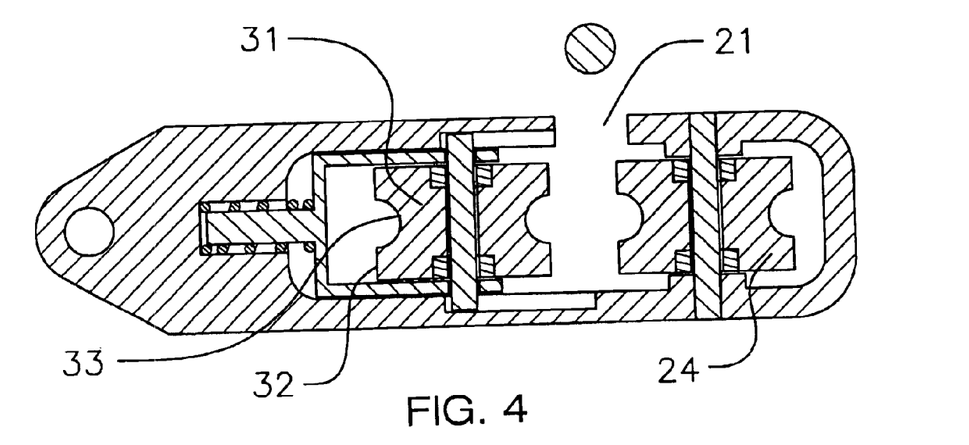
FIG. 4 is a schematic cross-sectional view of the present invention having the flexible member of the invention removed from the runner.
Figure 5:
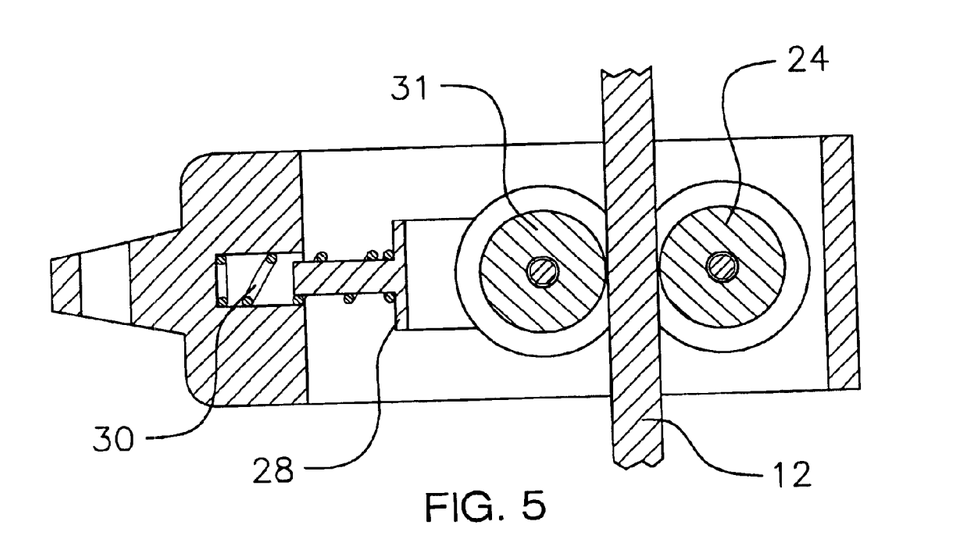
FIG. 5 is a schematic cross-sectional view of the present invention taken along line 5—5 of FIG. 2.
Figure 6:
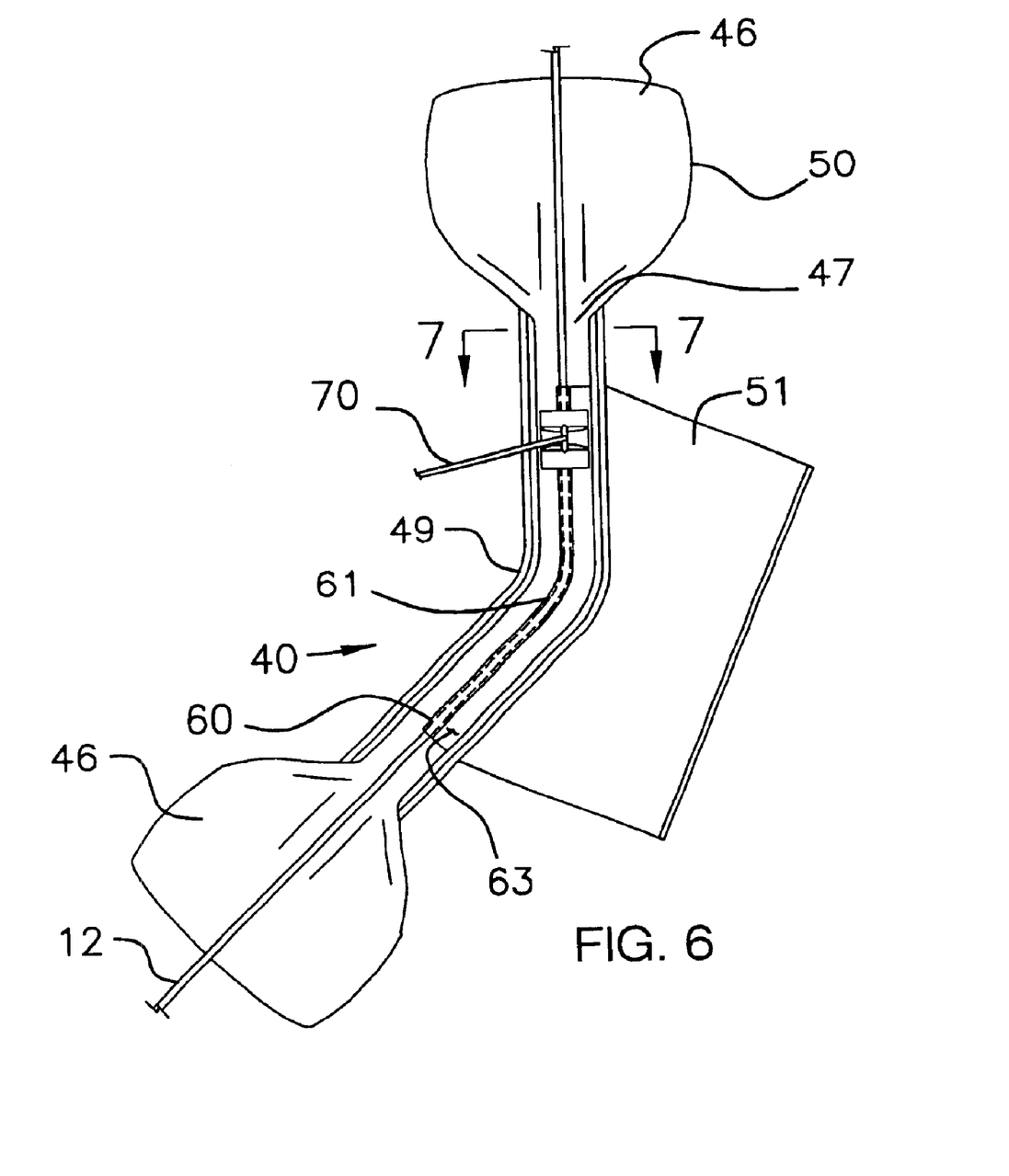
FIG. 6 is a schematic bottom plan view of the runner guide of the present invention.
Figure 7:
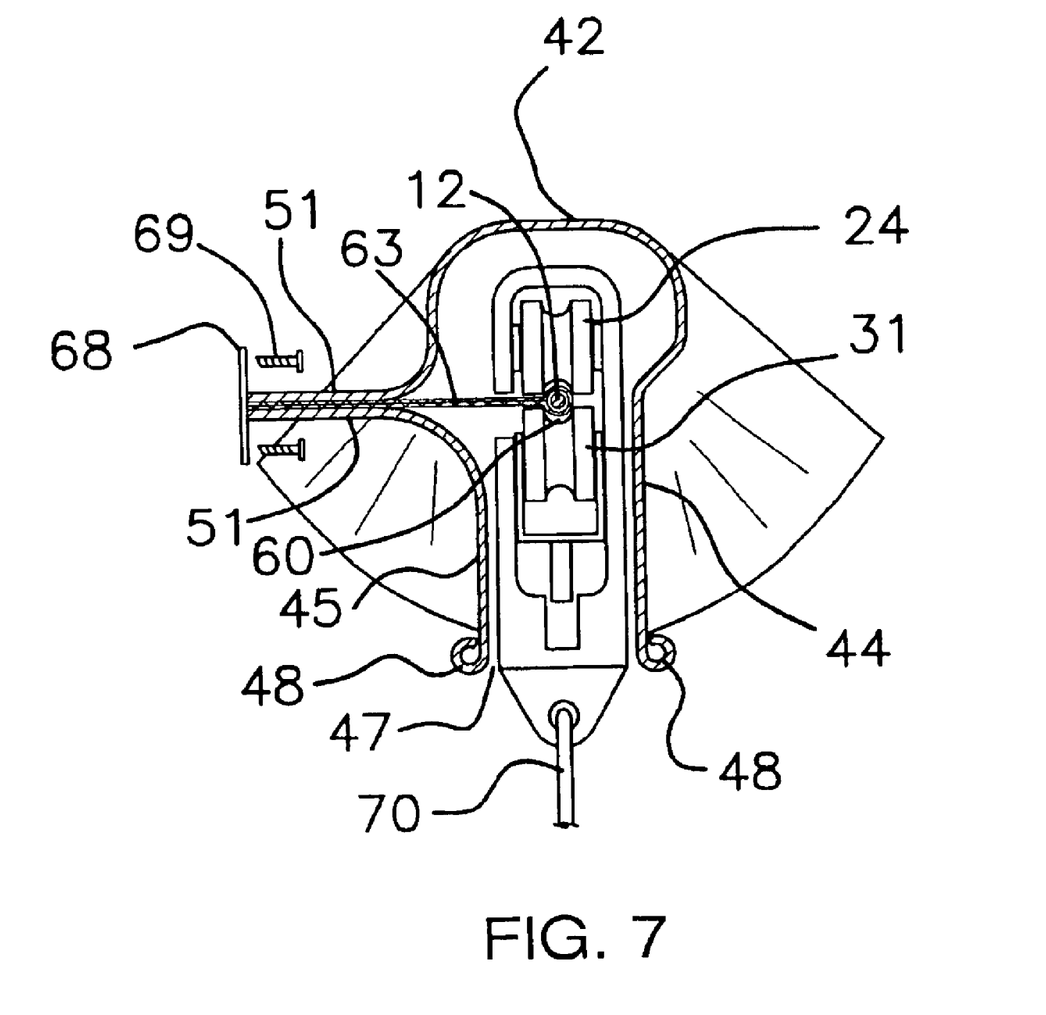
FIG. 7 is a schematic cross-sectional view taken along line 7—7 of FIG. 6 of the present invention.
Figure 8:
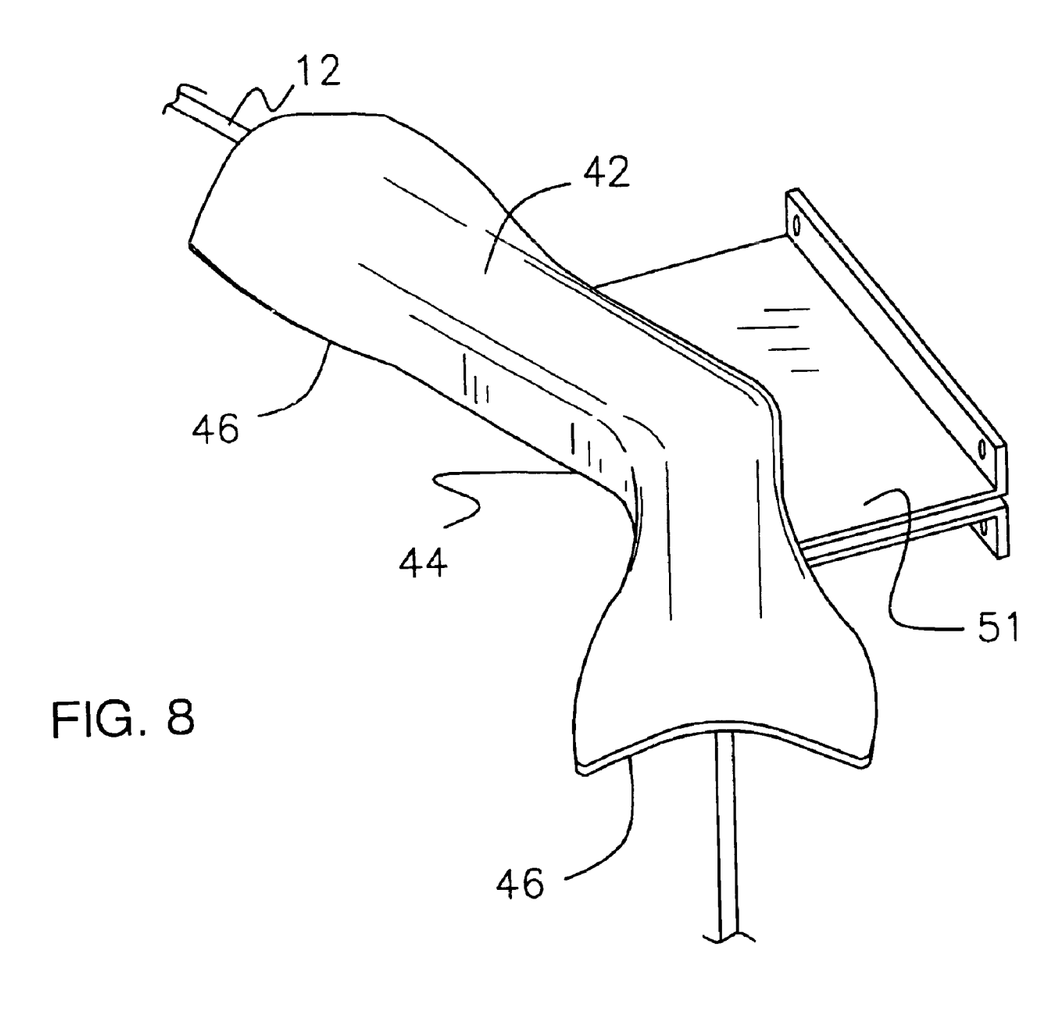
FIG. 8 is a perspective view of the runner guide of the present invention.

Further included in the runner 14 is a saddle 28 that is mounted in the aperture 20 and is positioned between the first guide wheel 24 and the lower wall 17 of the housing 15. The saddle 28 rides in elongated notches 29 so that it is selectively movable toward and away from the first guide wheel 24. A biasing member 30 is mounted in the aperture 20 for biasing the saddle 28 toward the first guide wheel 24. The biasing member 30 is preferably a spring. A second guide wheel 31 is rotatably mounted in the saddle 28 such that the first 24 and second 31 guide wheels abut when the saddle 28 is positioned toward the first guide wheel 24. The second guide wheel 31 has a rotational axis orientated substantially parallel to the rotational axis of the first guide wheel 24. The second guide wheel 31 has a perimeter edge 32 having a peripheral depression 33 extending therein for releasably receiving the flexible member 12. FIG. 4 demonstrates how the first 24 and second 31 guide wheels may be moved apart from each other for removal or insertion of the flexible member 12 through the slot 21.

The flexible member 12 extends through an elongated tubular member 60. The elongated tubular member 60 has a bend 61 therein such that the elongated tubular member 60 forms an obtuse angle. A coupler 62 is attached to the elongate tubular member 61 for selectively coupling the elongated tubular member 60 to a vertical structure. The coupler 62 includes a plate 63 and a securing member 64. The plate 63 is attached to and extends along a length of the elongated tubular member 60. The securing member 64 is preferably a tether for attaching the elongated tubular member 60 to a tree 6 or post. The tether, or securing member 64, is attached to a free edge 66 of the plate 63. Ideally, a spring 65 is positioned on the tether to cushion the movement of the runner on the flexible member 60. Alternatively, the securing member 64 may comprise a bracket 68 attached to the free edge 66 of the plate 63. Fasteners 69 may be extended through the bracket 68 for securing it to a dwelling 7. Preferably, the elongated tubular member 60 is positioned so that it is more than eight feet above a ground surface.

The flexible member 12 extends through a runner guide 40, so that the tubular member 60 is positioned within the runner guide 40. It is envisioned that the flexible member 12 will extend through a plurality of tubular members 60 and an associated one of a plurality of runner guides 40. The runner 14 may selectively pass through the runner guide 40 to allow its movement along a length of the flexible member 12. The runner guide 40 preferably includes an elongated sleeve having a top wall 42, a first side wall 44, a second side wall 45, an open bottom side 47 and a pair of open ends 46. Preferably, rounded bottom edges 48 are attached to the bottom edges of the first 44 and second 45 side walls. The coupler 62, specifically the plate 63, extends through the second side wall 45 of the sleeve, or runner guide 40. The sleeve 40 has a bend 49 therein such that the first side wall 44 forms an angle having a measurement generally equal to the angle of the elongated tubular member 60. Each of the pair of open ends 46 has a perimeter edge 50 that flares outwardly for easy receiving of the runner 14. Preferably, flanges 51 are attached to the second side wall 45 which cover the plate 63 and are attached thereto for aiding the stability of the runner guide 40. Free edges of the flanges 51 are attached to either the bracket 68 or tether.

A leash 70 has a first end 71 and a second end 72. The first end 71 of the leash 70 is attached to the loop 22. The second end 72 of the leash 70 may be releasably coupled to the animal 8.

In use, the runner guides 40 are positioned in a spaced relationship to each other and then secured where desired by driving the posts 60 into the ground. The cord, or flexible member 12, is then extended through the runner guides 40. The device 10 may be used with the cord 12 being in a loop formation which is slid through the open bottom side 47, or it may have a pair of free ends. The free ends may be secured to an object or attached to stakes which are driven into the ground. Either way is sufficient and neither is central to the functionality of the device. The runner 14 is then positioned on the flexible member 12 by pulling the second guide wheel 31 away from the first guide wheel 24 and inserting the flexible member 12 through the slot 21 in the housing 15 so that it rests between the first 24 and second 31 guide wheels. The second guide wheel 31 is released so that the flexible member 12 is held between the first 24 and second 31 guide wheels in a manner that allows it to move along the elongate flexible member 12.

The leash 70 is attached to and extends between an animal 8 and the runner 14. As the animal 8 moves, the runner 14 moves along the flexible member 12 so that the animal has more room to move compared to a conventional leash but is still secured in a selected area. The open ends 46 of the runner guides 40 are flared outwardly and upwardly so that the runner 14 does not get caught on their perimeter edge 50. The flared edges direct the leash up the perimeter edge 50 and into the open bottom side 47. The biasing member 30, in addition to holding the flexible member 12 within the housing 15, allows the second guide wheel 31 to move toward the lower wall 17 of the housing 15. This aids in the movement of the runner 14 through the runner guide 40 as the allowed movement of the housing 15 on the flexible member 12 aids in preventing the upper wall 16 from hitting the top wall 42 of the sleeve 40. The runner guides 40 need not be bent, though this configuration aids in forming a loop with the flexible member 12 and for passage of the runner 14 therethrough. The configurations of the runner guides 40 and runner 14 allow for the housing 15 to hang down as it passes through the runner guide 40. This places the leash 70 in contact with the runner guide 40 instead of the runner 14 moving against the runner guide 40. Consequently, this allows the leash 70 to have little opportunity to catch on the perimeter edges 50 or the open bottom side 47 so that the leash 70 along with the runner 40 may move relatively effortlessly through the runner guide 40.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A device for leashing an animal, said device comprising:
   an elongated flexible member;
   a runner, said flexible member extending through said runner such that said runner may be selectively positioned along a length of said flexible member, wherein said runner includes:
      a housing having a upper wall, a lower wall, a first lateral wall and a second lateral wall such that than an elongated aperture is defined extending through said housing and between said upper and lower walls, said first lateral wall having a slot extending therethrough and into said aperture, said slot being oriented substantially perpendicular to a longitudinal axis of said housing extending through said upper and lower walls, wherein said flexible member may be extended through said slot for selective positioning into said runner;
      a first guide wheel being rotatably mounted in said aperture and being positioned nearer said upper wall of said housing, said first guide wheel having a rotational axis oriented substantially perpendicular to said longitudinal axis and perpendicular to a plane of said first lateral wall, said first guide wheel having a perimeter edge having a peripheral depression extending therein for releasably receiving said flexible member;
   a saddle being mounted in said aperture and being positioned between said first guide wheel and said lower wall of said housing, said saddle being selectively movable toward and away from said first guide wheel, a second guide wheel being rotatably mounted in said saddle such that said first and second guide wheels about when said saddle is positioned toward said first guide wheel, said second guide wheel having a rotational axis oriented substantially parallel to said rotational axis of said first guide wheel, said second guide wheel having a perimeter edge having a peripheral depression extending therein for releasably receiving said flexible member;
   an elongated tubular member having a bend therein such that said elongated tubular member forms an obtuse angel, said flexible member extending through said elongated tubular member, a coupler being attached to said elongated tubular member for selectively coupling said elongated tubular member to a vertical structure; and
   a leash having a first end and a second end, said first end of said leash being attached said runner, wherein said second end of said leash may be releasably coupled to an animal.

2. The device for leashing an animal of claim 1, further including a biasing member being mounted in said aperture for biasing said saddle toward said first guide wheel.

3. The device for leashing an animal of claim 1, further including a loop being attached to said lower wall of said housing, said first end of said leash being attached to said loop.

4. The device for leashing an animal of claim 1, further including a runner guide, said flexible member extending through said runner guide such that said elongated tubular member is positioned within said runner guide, wherein said runner may selectively pass through said runner guide.

5. The device for leashing an animal of claim 4, wherein said runner guide includes an elongated sleeve having a top wall, a first side wall, a second side wall, an open bottom side and a pair of open ends, said coupler extending through said second side wall of said sleeve, said sleeve having a bend therein such that said first side wall forms an angle having a measurement generally equal to said angle of said elongated tubular member.

6. The device for leashing an animal of claim 5, wherein each of said pair of open ends flaring outwardly.

7. The device for leasing an animal of claim 1, wherein said coupler comprises a plate and a securing member, said plate being attached to and extending along a length of said elongated tubular member, said securing member comprising a tether being attached to and extending away from a free end of said plate.

8. The device for leashing an animal of claim 1, wherein said coupler comprises a plate and a securing member, said plate being attached to and extending along a length of said elongated tubular member, said securing member comprising a bracket being attached to and extending along a length of free edge of said plate, a plurality of fasteners being selectively extendible through said bracket and into the vertical structure.

9. A device for leashing an animal, said device comprising:
   an elongated flexible member, said flexible member comprising a cord;
   a runner, said flexible member extending through said runner such that said runner may be selectively positioned along a length of said flexible member, said runner including:
      a housing having a upper wall, a lower wall, an first lateral wall and a second lateral wall such that than an elongated aperture is defined extending through said housing and between said upper and lower walls, said first lateral wall having a slot extending therethrough and into said aperture, said slot being orientated substantially perpendicular to a longitudinal axis of said housing extending through said upper and lower walls, wherein said flexible member may be extended through said slot for selective positioning into said runner;
      a first guide wheel being rotatably mounted in said aperture and being positioned nearer said upper wall of said housing, said first guide wheel having a rotational axis oriented substantially perpendicular to said longitudinal axis and perpendicular to a plane of said first lateral wall, said first guide wheel having a perimeter edge having a peripheral depression extending therein for releasably receiving said flexible member;
      a saddle being mounted in said aperture and being positioned between said first guide wheel and said lower wall of said housing, said saddle being selectively movable toward and away from said first guide wheel;
      a biasing member being mounted in said aperture for biasing said saddle toward said first guide wheel;
      a second guide wheel being rotatably mounted in said saddle such that said first and second guide wheels abut when said saddle is positioned toward said first guide wheel, said second guide wheel having a rotational axis oriented substantially parallel to said rotational axis of said first guide wheel, said second guide wheel having a perimeter edge having a peripheral depression extending therein for releasably receiving said flexible member;
      a loop being attached to said lower wall of said housing;

an elongated tubular member having a bend therein such that said elongated tubular member forms an obtuse angle, said flexible member extending through said elongated tubular member, a coupler being attached to said elongated tubular member for selectively coupling said elongated tubular member to a vertical structure;

a runner guide, said flexible member extending through said runner guide such that said elongated tubular member is positioned within said runner guide, wherein said runner may selectively pass through said runner guide, said runner guide including:

an elongated sleeve having a top wall, a first side wall, a second side wall, an open bottom side and a pair of open ends, said coupler extending through said second side wall of said sleeve, said sleeve having a bend therein such that said first side wall forms an angle having a measurement generally equal to said angle of said elongated tubular member, each of prior of open ends flaring outwardly; and a leash having a first end and a second end, said first end of said leash being attached to said loop, wherein said second end of said leash may be releasably coupled to an animal.

10. A device for leashing an animal, said device comprising:

an elongated flexible member;

a runner, said flexible member extending through said runner such that said runner may be selectively positioned along a length of said flexible member;

an elongated tubular member having a bend therein such that said elongated tubular member forms an obtuse angle, said flexible member extending through said elongated tubular member, a coupler being attached to said elongated tubular member for selectively coupling said elongated tubular member to a vertical structure;

a runner guide, said flexible member extending through said runner guide such that said elongated tubular member is positioned within said runner guide, wherein said runner may selectively pass through said runner guide, said runner guide including an elongated sleeve having a top wall, a first side wall, a second side wall, an open bottom side and a pair of open ends, said coupler extending through said second side wall of said sleeve, and sleeve having a bend therein such that said first side wall forms an angle having a measurement generally equal to said angle of said elongated tubular member; and a leash having a first end and a second end, said first end of said leash being attached to said runner, wherein said second end of said leash may be releasably coupled to an animal.

11. The device for leashing an animal of claim 10, wherein each of said pair of open ends flaring outwardly.

\* \* \* \* \*